(12) United States Patent
Sathyanarayana

(10) Patent No.: US 9,558,005 B2
(45) Date of Patent: Jan. 31, 2017

(54) RELIABLE AND DETERMINISTIC LIVE MIGRATION OF VIRTUAL MACHINES

(71) Applicant: Intel Corporation, Santa Clara, CA (US)

(72) Inventor: Krishnamurthy Jambur Sathyanarayana, Shannon (IE)

(73) Assignee: Intel Corporation, Santa Clara, CA (US)

(*) Notice: Subject to any disclaimer, the term of this patent is extended or adjusted under 35 U.S.C. 154(b) by 81 days.

(21) Appl. No.: 14/280,997

(22) Filed: May 19, 2014

(65) Prior Publication Data

US 2015/0331715 A1    Nov. 19, 2015

(51) Int. Cl.
  *G06F 15/173*    (2006.01)
  *G06F 9/44*    (2006.01)
  (Continued)

(52) U.S. Cl.
  CPC .............. *G06F 9/44* (2013.01); *G06F 9/45558* (2013.01); *G06F 9/4875* (2013.01); *G06F 9/50* (2013.01); *G06F 9/5055* (2013.01); *H04L 67/10* (2013.01); *G06F 9/4856* (2013.01); *G06F 9/5088* (2013.01); *G06F 2009/4557* (2013.01); *G06F 2209/485* (2013.01); *G06F 2209/503* (2013.01)

(58) Field of Classification Search
  CPC .... G06F 9/4875; G06F 9/4856; G06F 9/5088; H04L 67/10
  USPC ........................................................ 709/226
  See application file for complete search history.

(56) References Cited

U.S. PATENT DOCUMENTS 8,615,579 B1 * 12/2013 Vincent ................. G06F 9/4856
                                                                    709/223
8,775,585 B2 *  7/2014 Allen ................... H04L 12/2602
                                                                    709/223
(Continued)

FOREIGN PATENT DOCUMENTS

JP          2013-250775        12/2013

OTHER PUBLICATIONS

Notice of Reasons for Rejection and English Translation for Japanese Application No. 2015-082915, dated Apr. 26, 2016, 5 pages.

*Primary Examiner* — James Conaway
(74) *Attorney, Agent, or Firm* — Barnes & Thornburg LLP

(57) ABSTRACT

Technologies for live virtual machine migration include a plurality of compute nodes and a datacenter manager. The datacenter manager issues a request to migrate a virtual machine to a source compute node. The request includes a service level requirement such as a maximum migration time or downtime. The source compute node determines platform resources required to perform migration within the service level requirement and reserves the platform resources for a predicted migration time. The source compute node transfers virtual machine state to a destination compute node and releases the platform resources after the transfer is complete. The source compute node may use a hardware resource monitor or reservation manager to determine available platform resources and reserve the platform resources for exclusive use. If sufficient platform resources are not available, the source compute node may negotiate reduced service level requirements with the datacenter manager. Other embodiments are described and claimed.

25 Claims, 7 Drawing Sheets

(51) Int. Cl.
*G06F 9/48* (2006.01)
*H04L 29/08* (2006.01)
*G06F 9/50* (2006.01)
*G06F 9/455* (2006.01)

(56) References Cited

U.S. PATENT DOCUMENTS

| | | | | |
|---|---|---|---|---|
| 2006/0206619 A1* | 9/2006 | Dan | ................... | G06F 21/6218 709/233 |
| 2008/0222638 A1* | 9/2008 | Beaty | ................. | G06F 9/45558 718/100 |
| 2010/0131624 A1* | 5/2010 | Ferris | ................... | G06F 9/5072 709/221 |
| 2011/0099548 A1* | 4/2011 | Shen | .................. | G06F 9/45558 718/1 |
| 2012/0089726 A1* | 4/2012 | Doddavula | ............ | H04L 67/34 709/224 |
| 2013/0085742 A1* | 4/2013 | Barker | ................. | G06F 9/5088 703/22 |
| 2013/0085998 A1* | 4/2013 | Barker | ................. | G06F 9/5088 707/649 |
| 2013/0091282 A1* | 4/2013 | Tontiruttananon | .... | G06F 9/5061 709/226 |
| 2013/0311989 A1* | 11/2013 | Ota; Hiromichi | .. | G06F 9/45558 718/1 |
| 2014/0059559 A1* | 2/2014 | Alatorre | .................... | G06F 9/50 718/104 |
| 2014/0115162 A1* | 4/2014 | Kalyanaraman | .. | H04L 29/08954 709/226 |
| 2015/0195347 A1* | 7/2015 | Luft | ........................ | H04L 67/10 709/203 |
| 2015/0205638 A1* | 7/2015 | Motoki | ................ | G06F 9/5088 711/162 |
| 2015/0234644 A1* | 8/2015 | Ramanathan | ............ | G06F 9/50 709/226 |
| 2015/0256446 A1* | 9/2015 | Doi | ....................... | G06F 9/5061 709/203 |
| 2015/0269053 A1* | 9/2015 | Kato | ................... | G06F 11/3428 718/105 |

\* cited by examiner

RELIABLE AND DETERMINISTIC LIVE MIGRATION OF VIRTUAL MACHINES

BACKGROUND

Data centers increasingly rely on virtualization to deliver services to customers. A typical data center may include clusters of densely packed computing servers, called nodes, with each node potentially executing many virtual machines. Typically, each node includes a hypervisor or other virtualization framework, and the entire data center includes one or more datacenter managers that manage instantiation of virtual machines on the particular compute nodes. Virtual machines may be transferred, or "migrated," between nodes by transferring the complete state of the virtual machine from a source node to the destination node. Virtual machine migration may be performed "live," that is, without interrupting the state of the virtual machine and with minimal disruption to services provided. However, typical virtualized data centers may not provide time-critical or high-availability guarantees for virtual machine migration. Thus, virtual machine migration typically causes some amount of downtime when the virtual machine is unavailable, and that downtime may vary depending on virtual machine size, virtual machine load, network traffic, and other factors that may be unpredictable.

Telecommunication network functions are increasingly being consolidated into network data centers. For example, cellular base station functions that have historically been distributed among many cell towers may now be consolidated into a virtualized network data center. However, telecommunication networks typically have extremely high reliability requirements. Accordingly, typical live migration of virtual machines may have difficulty consistently achieving the reliability requirements for telecommunication network functions.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
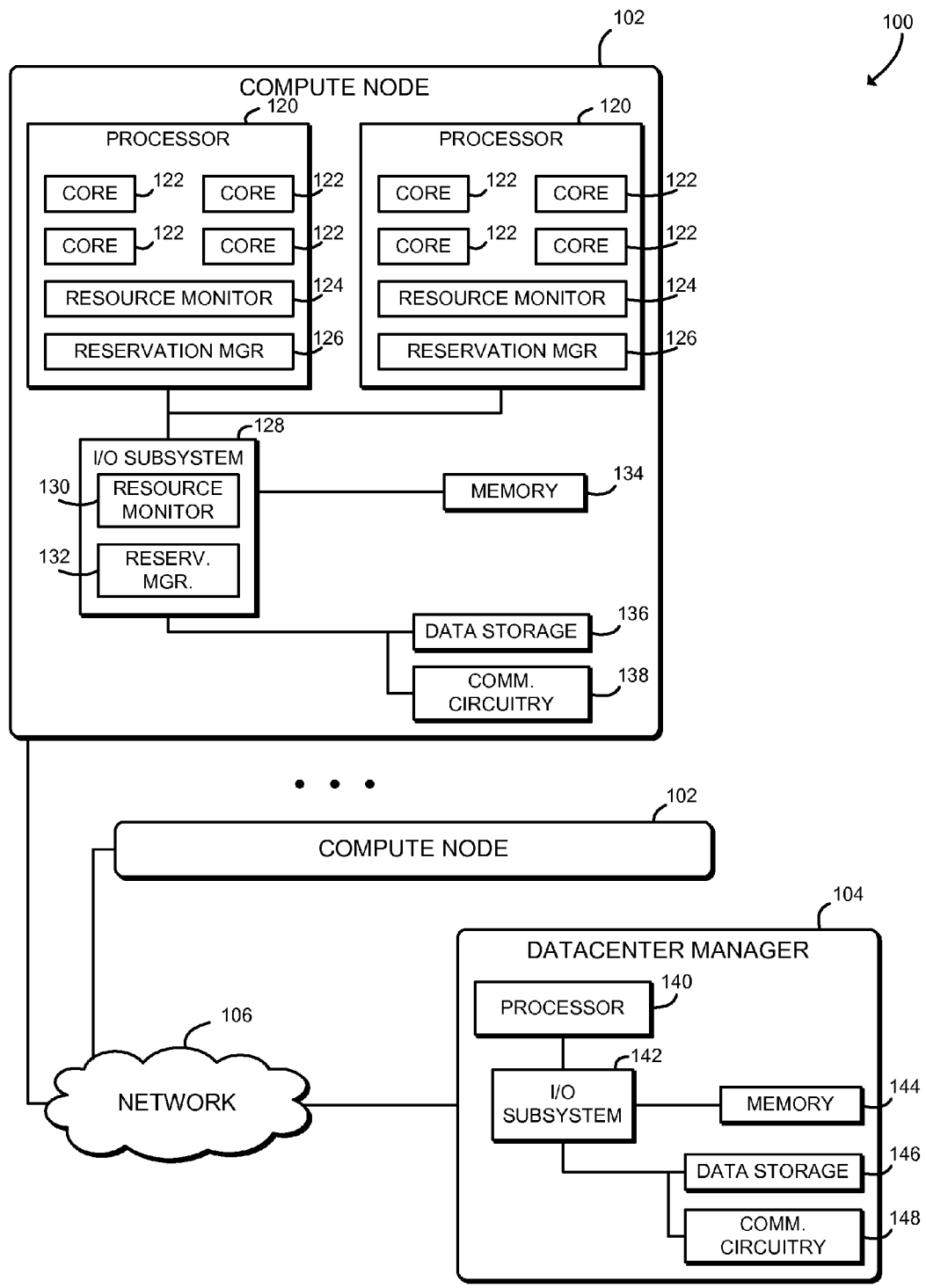
FIG. 1 is a simplified block diagram of at least one embodiment of a system for live virtual machine migration.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C): (A and B); (A and C); (B and C); or (A, B, and C). Similarly, items listed in the form of "at least one of A, B, or C" can mean (A); (B); (C): (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a system 100 for live virtual machine migration includes a number of compute nodes 102 and a datacenter manager 104 in communication over a network 106. In use, as discussed in more detail below, each compute node 102 may instantiate one or more virtual machines to perform computational tasks. The datacenter manager 104 may direct a source compute node 102 to migrate a virtual machine to a destination compute node 102, specifying a particular required service level (e.g., maximum downtime, total migration time, or network bandwidth usage). The source compute node 102 determines the platform resources required to achieve the specified service level and whether those required platform resources are available. If the required platform resources are available, the source compute node 102 reserves those resources and performs the migration using the reserved resources. If the required platform resources are not available, the source compute node 102 may determine an achievable service level and negotiate with the datacenter manager 104 whether to proceed with the migration using the reduced, but achievable, service level. Determining the required resources and reserving those resources may improve the reliability and performance of the virtual machine migration, particularly for large virtual machines or virtual machines with high memory loads. Additionally, determinism of the downtime and/or total migration time of the migration may be improved; that is, the actual downtime and/or total migration time may be more predictable. Additionally, the datacenter manager 104 may develop improved migration plans based on information received from the compute nodes 102 about whether a specified service level is achievable, for example to distribute computational tasks based on power consumption, computational load, geographic location, or otherwise. Thus, the increased reliability, performance, and determinism of live virtual machine migration may improve the suitability of virtualized solutions for telecommunications network workloads.

Figure 2:
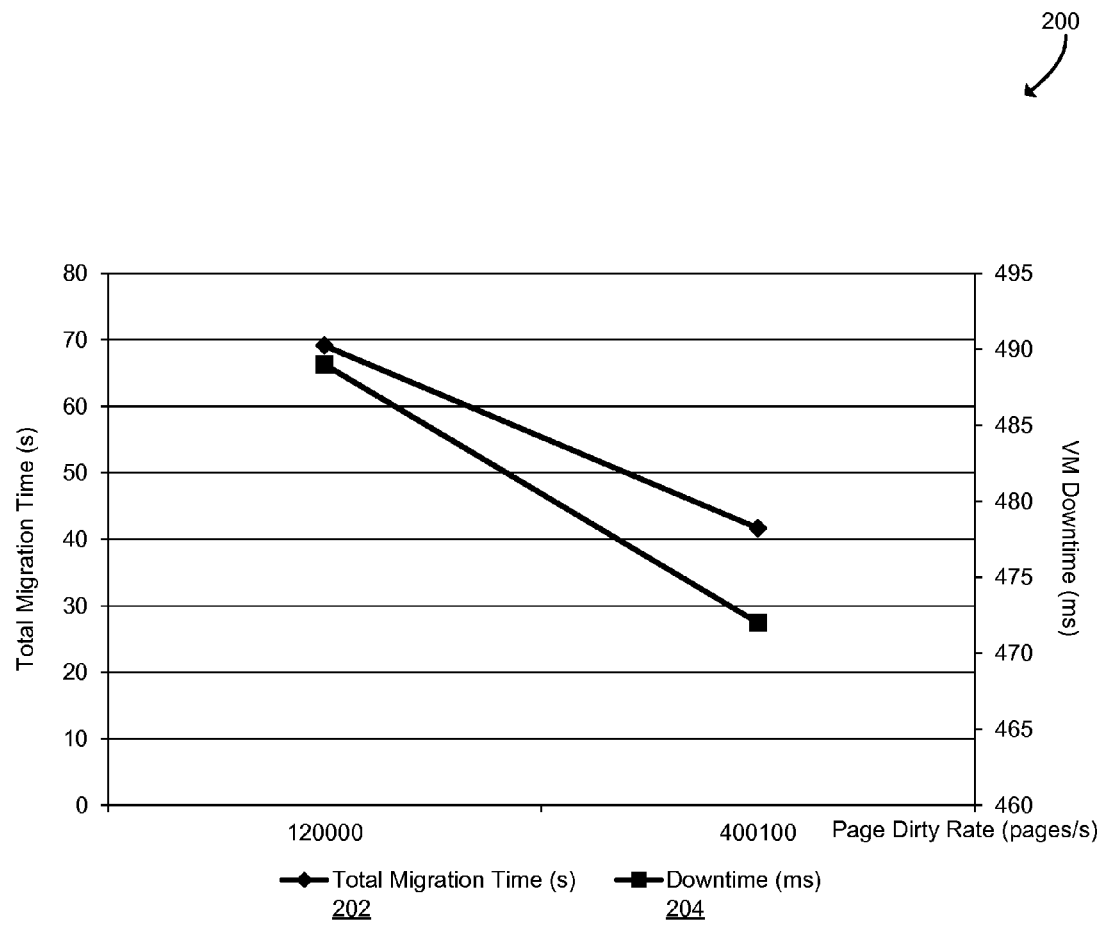
FIG. 2 is a chart illustrating simulated results that may be achieved by the system of FIG. 1.

Referring now to FIG. 2, the chart 200 illustrates simulated experimental results that may be achieved using the system 100. The curve 202 illustrates total virtual machine migration time in seconds, and the curve 204 illustrates virtual machine downtime in milliseconds. The first datapoint in both curves 202, 204 illustrates simulated results for a virtual machine transfer using QEMU 1.6.0, which is a typical open-source machine emulator and virtualizer. As shown in chart 200, the typical virtualizer may achieve a total migration time of 69.11 seconds and a downtime of 489 milliseconds, given a page dirty rate (indicative of the memory load of the virtual machine) of 120,000 pages per second. The second datapoint in both curves 202, 204 illustrates simulated results for a virtual machine transfer using a patched version of QEMU 1.6.0 embodying some of the technologies disclosed herein. As shown in the chart 200, the patched virtualizer may achieve a total migration time of 41.66 seconds and a downtime of 472 milliseconds, given a page dirty rate of 400,100 pages per second. Thus, the results shown in the chart 200 illustrate that the system 100 may reduce total migration time and downtime while at the same time handling much higher memory loads (i.e., more than three times greater load). Embodiments of the system 100 including hardware support as described herein may provide additional improvements in performance, determinism, and/or reliability.

Referring back to FIG. 1, each compute node 102 may be embodied as any type of computation or computer device capable of performing the functions described herein, including, without limitation, a computer, a multiprocessor system, a server, a rack-mounted server, a blade server, a laptop computer, a notebook computer, a network appliance, a web appliance, a distributed computing system, a processor-based system, and/or a consumer electronic device. As shown in FIG. 1, each compute node 102 illustratively includes two processors 120, an input/output subsystem 128, a memory 134, a data storage device 136, and communication circuitry 138. Of course, the compute node 102 may include other or additional components, such as those commonly found in a server device (e.g., various input/output devices), in other embodiments. Additionally, in some embodiments, one or more of the illustrative components may be incorporated in, or otherwise form a portion of, another component. For example, the memory 134, or portions thereof, may be incorporated in one or more processor 120 in some embodiments.

Each processor 120 may be embodied as any type of processor capable of performing the functions described herein. Each illustrative processor 120 is a multi-core processor, however in other embodiments each processor 120 may be embodied as a single or multi-core processor(s), digital signal processor, microcontroller, or other processor or processing/controlling circuit. Each processor 120 illustratively includes four processor cores 122, a resource monitor 124, and a reservation manager 126. Each of the processor cores 122 is an independent processing unit capable of executing programmed instructions. Although each of the illustrative compute nodes 102 includes two processors 120 having four processor cores 122; each compute node 102 may include one, two, or more processors 120 having one, two, or more processor cores 122 each in other embodiments. In particular, the technologies disclosed herein are also applicable to uniprocessor or single-core compute nodes 102.

The resource monitor 124 may be embodied as any hardware component capable of providing accurate, real-time information on utilization of platform resources by the processor 120 and/or the compute node 102. For example, the resource monitor 124 may provide information on the usage of computational or other execution resources of the processor 120 and/or the processor cores 122, usage of the memory 134, or I/O usage such as usage of the communication circuitry 138. The reservation manager 126 may be embodied as any hardware component capable of exclusively reserving for a specified time period one or more platform resources of the processor 120 and/or the compute node 102 for the use of a particular software context (e.g., a process or thread). Once reserved, the particular platform resources may not be preempted, contended, or otherwise used by other software contexts of the compute node 102, including any operating system, virtual machine monitor, or hypervisor of the compute node 102. For example, the reservation manager 126 may reserve one or more of the processor cores 122 for the use of a particular software context. While reserved, those processor cores 122 may not be interrupted, preempted, or otherwise used by other software contexts. As another example, the reservation manager 126 may reserve particular pages of the memory 134 that may not be paged out to disk or otherwise interfered with, or reserve particular amount of I/O bandwidth that may not be reduced. Although the illustrative processors 120 include the resource monitor 124 and the reservation manager 126, in other embodiments the processors 120 may not include hardware support for those functions. For example, the processors 120 may be embodied as typical server, desktop, or mobile processors 120.

The memory 134 may be embodied as any type of volatile or non-volatile memory or data storage capable of performing the functions described herein. In operation, the memory 134 may store various data and software used during operation of the compute node 102 such as operating systems, applications, programs, libraries, and drivers. The memory 134 is communicatively coupled to the processor 120 via the I/O subsystem 128, which may be embodied as circuitry and/or components to facilitate input/output operations with the processor 120, the memory 134, and other components of the compute node 102. For example, the I/O subsystem 128 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 128 may form a portion of a system-on-a-chip (SoC) and be incorporated, along with the processors 120, the memory 134, and other components of the compute node 102, on a single integrated circuit chip.

The illustrative I/O subsystem 128 further includes a resource monitor 130 and a reservation manager 132. Those components perform similar functions to the resource monitor 124 and the reservation manager 126 of the processor 120, respectively, the description of which is applicable to the corresponding components of the I/O subsystem 128 and is not repeated herein so as not to obscure the present disclosure. Additionally or alternatively, in some embodiments the resource monitor 130 and/or the reservation manager 132 may monitor and/or reserve different platform resources from those components of the processor 120. For example, the components of the I/O subsystem 128 may monitor and reserve the memory 134 and/or I/O resources such as bandwidth of the communication circuitry 138. Also, in some embodiments, the I/O subsystem 128 may include one or more dedicated resource monitors 130 and/or reservation managers 132 dedicated to particular subsystems of the computing device 100, such as the memory subsystem. Similar to the processor 120, in some embodiments the I/O subsystem 128 may not include hardware support for those functions. For example, the I/O subsystem 128 may be embodied as a typical server, desktop, or mobile chipset.

The data storage device 136 may be embodied as any type of device or devices configured for short-term or long-term storage of data such as, for example, memory devices and circuits, memory cards, hard disk drives, solid-state drives, or other data storage devices. The data storage device 136 may be used to store virtual machine applications or as a backing store for virtual machine memory pages.

The communication circuitry 138 of the compute node 102 may be embodied as any communication circuit, device, or collection thereof, capable of enabling communications between the compute node 102, the datacenter manager 104, and/or other remote devices over the network 106. The communication circuitry 138 may be configured to use any one or more communication technology (e.g., wired or wireless communications) and associated protocols (e.g., Ethernet, Bluetooth®, Wi-Fi®, WiMAX, etc.) to effect such communication. In some embodiments, the communication circuitry 138 may include specialized hardware for accelerating or offloading network functionality from the other components of the compute node 102. For example, in some embodiments the communication circuitry 138 may include support for hardware-accelerated compression of network traffic.

The datacenter manager 104 is configured to manage virtual machines or other compute instances distributed among the compute nodes 102 of the system 100. The datacenter manager 104 may be embodied as any type of server computing device, or collection of devices, capable of performing the functions described herein. As such, the datacenter manager 104 may be embodied as a single server computing device or a collection of servers and associated devices. For example, in some embodiments, the datacenter manager 104 may be embodied as a "virtual server" formed from multiple computing devices distributed across the network 106 and operating in a public or private cloud. Accordingly, although the datacenter manager 104 is illustrated in FIG. 1 as embodied as a single server computing device, it should be appreciated that the datacenter manager 104 may be embodied as multiple devices cooperating together to facilitate the functionality described below. Illustratively, the datacenter manager 104 includes a processor 140, an I/O subsystem 142, a memory 144, a data storage device 146, communication circuitry 148, and/or other components and devices commonly found in a server or similar computing device. Those individual components of the datacenter manager 104 may be similar to the corresponding components of the compute nodes 102, the description of which is applicable to the corresponding components of the datacenter manager 104 and is not repeated herein so as not to obscure the present disclosure.

As discussed in more detail below, the compute nodes 102 and the datacenter manager 104 may be configured to transmit and receive data with each other and/or other devices of the system 100 over the network 106. The network 106 may be embodied as any number of various wired and/or wireless networks. For example, the network 106 may be embodied as, or otherwise include, a wired or wireless local area network (LAN), a wired or wireless wide area network (WAN), a cellular network, and/or a publicly-accessible, global network such as the Internet. As such, the network 106 may include any number of additional devices, such as additional computers, routers, and switches, to facilitate communications among the devices of the system 100.

Figure 3:
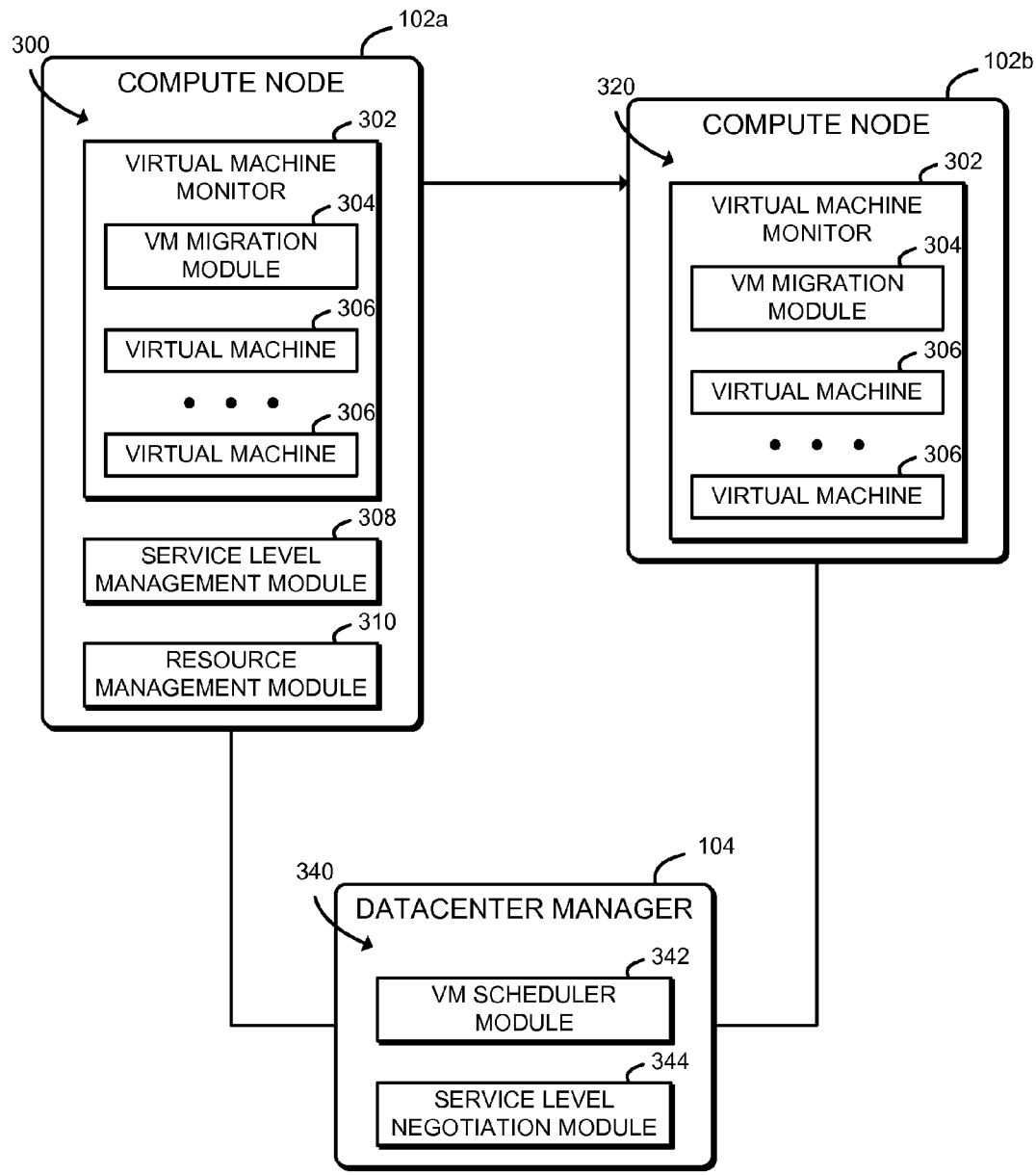
FIG. 3 is a simplified block diagram of at least one embodiment of various environments that may be established by the system of FIG. 1.

Referring now to FIG. 3, in an illustrative embodiment, a compute node 102a establishes an environment 300 during operation. The illustrative environment 300 includes a virtual machine monitor 302, a service level management module 308, and a resource management module 310. The various modules of the environment 300 may be embodied as hardware, firmware, software, or a combination thereof.

The virtual machine monitor 302 may be embodied as any virtual machine monitor, hypervisor, general operating system, specialized operating system, or other component that allows a virtualized workload to be executed on the compute node 102a. The virtual machine monitor 302 may further include a virtual machine migration module 304 and one or more virtual machines 306.

The virtual machine migration module 304 is configured to receive a request from the datacenter manager 104 to migrate a virtual machine 306 from the compute node 102a (the "source" compute node 102a) to a "destination" compute node 102b. The request also may specify a service level requirement for the migration such as a maximum downtime and/or a maximum total migration time. As further described below, the virtual machine migration module 304 is further configured to transfer the requested virtual machine 306 to the destination compute node 102b using reserved platform resources of the source compute node 102a. In some embodiments, the virtual machine migration module 304 may be further configured to negotiate reduced service level requirements with the datacenter manager 104 if the originally requested service level requirement is not achievable using currently available platform resources.

Each virtual machine 306 is configured to perform a compute workload on the source compute node 102a, such as a network function virtualization (NFV) workload. Each virtual machine 306 defines a current state including, for example, a current virtual memory state, a current virtual processor state, and/or a current virtual, emulated, or paravirtualized device state. The state of each virtual machine 306 may be embodied as a number of memory pages within the memory 134. Thus, a virtual machine 306 may be migrated to the destination compute node 102b by transferring those memory pages to the destination compute node 102b. As described below, the virtual machines 306 may be instantiated, migrated, and otherwise managed by the datacenter manager 104.

The service level management module 308 is configured to determine which platform resources are required to migrate the virtual machine 306 to the destination compute node 102b within the requested service level requirements. The service level management module 308 is further configured to, in some embodiments, determine what service level is achievable based on currently available platform resources of the source compute node 102a. As further described below, the platform resources may be embodied as any hardware, software, or I/O resource of the source compute node 102a that may be used to perform the virtual machine 306 migration process. Platform resources may include, for example, processor resources, memory resources, or I/O resources such as network bandwidth.

The resource management module 310 is configured to determine whether the platform resources required to migrate the virtual machine 306 to the destination compute node 102b within the requested service level requirements are available to the source compute node 102a. The resource management module 310 may monitor usage of the platform resources using software such as an operating system or the virtual machine monitor 302, or using hardware such as performance counters or the resource monitors 124, 130. The resource management module 310 is further configured to reserve platform resources for the virtual machine migration module 304 to migrate the virtual machine 306. The resource management module 310 may reserve the platform resources for a limited time, such as the predicted total migration time. The resource management module 310 may reserve the platform resources using software such as an operating system or the virtual machine monitor 302, or using hardware such as the reservation managers 126, 132.

Still referring to FIG. 3, in the illustrative embodiment, the destination compute node 102b establishes an environment 320 during operation. The illustrative environment 300 includes a virtual machine monitor 302, which includes a virtual machine migration module 304 and a number of virtual machines 306. The various modules of the environment 320 may be embodied as hardware, firmware, software, or a combination thereof.

The virtual machine monitor 302 is similar to the virtual machine monitor of the source compute node 102a, and thus may be embodied as any virtual machine monitor, hypervisor, general operating system, specialized operating system, or other component that allows a virtualized workload to be executed on the destination compute node 102b. Similarly, the virtual machine migration module 304 is similar to the virtual machine migration module 304 of the source compute node 102a and thus is configured to receive a virtual machine 306 from the source compute node 102a. As described above, each of the virtual machines 306 is configured to perform a compute workload on the destination compute node 102b. After receiving the state of the virtual machine 306 from the source compute node 102a, the destination compute node 102b resumes the virtual machine 306, completing the migration.

Still referring to FIG. 3, in the illustrative embodiment, the datacenter manager 104 establishes an environment 340 during operation. The illustrative environment 340 includes a virtual machine scheduler module 342 and a service level negotiation module 344. The various modules of the environment 340 may be embodied as hardware, firmware, software, or a combination thereof.

The virtual machine scheduler module 342 is configured to schedule virtual machines 306 for execution on various compute nodes 102 of the system 100. In particular, the virtual machine scheduler module 342 is configured to issue a request to migrate a virtual machine 306 from the source compute node 102a to the destination compute node 102b. The request to migrate the virtual machine 306 may include a service level requirement to be achieved by the source compute node 102a. The virtual machine scheduler module 342 may generate virtual machine 306 migration requests based on commands from any appropriate source. For example, the virtual machine scheduler module 342 may receive commands from a system administrator through a web-based control interface, a command line interface, or any other appropriate interface. As another example, in some embodiments, the virtual machine scheduler module 342 may receive and/or generate a command to migrate a virtual machine 306 based on demand for computing services, for example to balance workloads according to power consumption, load, or geography.

The service level negotiation module 344 is configured to receive an achievable service level from the source compute node 102a in response to the source compute node 102a being unable to achieve the requested service level. In response, the service level negotiation module 344 is configured to determine whether the achievable service level is acceptable and transmit an appropriate response to the source compute node 102a indicating whether to proceed with the virtual machine 306 migration. For example, the source compute node 102a may indicate an achievable service level when sufficient platform resources are not available to fulfill the requested service level requirement. The service level negotiation module 344 may apply any criteria to determine whether the achievable service level is acceptable, including prompting the user for approval.

Figure 4:
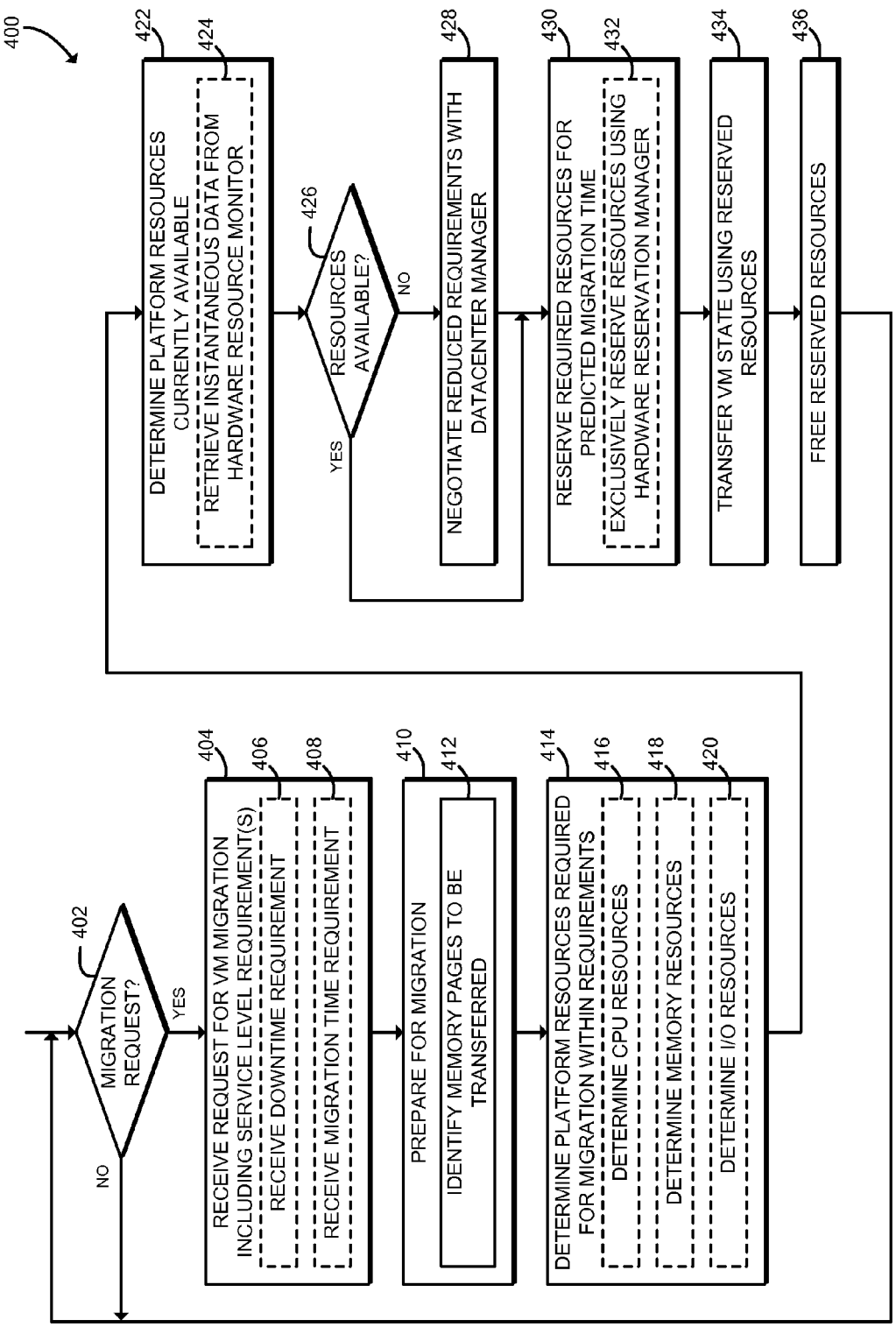
FIG. 4 is a simplified flow diagram of at least one embodiment of a method for live virtual machine migration that may be executed by a compute node of the system of FIGS. 1 and 3.

Referring now to FIG. 4, in use, the source compute node 102a may execute a method 400 for migrating a virtual machine 306. The method 400 begins with block 402, in which the source compute node 102a determines whether it has received a migration request from the datacenter manager 104. If not, the method 400 loops back to block 402 to continue monitoring for migration requests. If a migration request is received, the method 400 advances to block 404.

In block 404, the source compute node 102a receives the request for virtual machine migration from the datacenter manager 104. The request for virtual machine migration may specify the virtual machine 306 to be migrated, the destination compute node 102b, as well as one or more service level requirements for the migration. The service level requirements may specify any limit, threshold, metric, or other performance and/or reliability measure to be achieved while migrating the virtual machine 306 to the destination compute node 102b. In some embodiments, in block 406 the source compute node 102a may receive a downtime requirement with the request. The downtime requirement may specify a maximum time that the virtual machine 306 is to be paused or otherwise unavailable during the migration. For example, in some telecommunication network function virtualization (NFV) workloads, the downtime requirement may be expressed as a number of microseconds or milliseconds. In some embodiments, in block 408, the source compute node 102a may receive a migration time requirement. The migration time requirement may specify a maximum total migration time, that is, a maximum time between receipt of the request for migration and activation of the virtual machine 306 on the destination compute node 102b.

In block 410, the source compute node 102a prepares the virtual machine 306 for migration. The source compute node 102a may perform any task required to migrate the virtual machine 306. For example, the source compute node 102a may determine whether the destination compute node 102b is reachable over the network 106, capable of receiving the virtual machine 306, or perform other compatibility checks. In block 412, the source compute node 102a identifies pages of the memory 134 to be transferred to the destination compute node 102b. The memory pages to be transferred may include memory pages corresponding to the memory state of the virtual machine 306; virtualized, emulated, or para-virtualized device states of the virtual machine 306; virtual processor states of the virtual machine 306, including virtual register state and virtual processor flags; or any other memory pages corresponding to the current state of the virtual machine 306.

In block 414, the source compute node 102a determines the platform resources required to complete the virtual machine 306 migration within the specified service level requirements. The platform resources required to complete the virtual machine 306 migration may depend on the number of memory pages to be transferred, any data compression or other processing to be performed on the memory pages, or any other factor affecting the computational, storage, or communication complexity of transferring the virtual machine 306. In some embodiments, in block 416 the source compute node 102a may determine processor 120 resources required to complete the virtual machine 306 migration. For example, in some embodiments, the source compute node 102a may determine that an entire processor 120 or processor core 122 (i.e., one hundred percent CPU utilization) is required to complete the virtual machine 306 migration. In block 418, the source compute node 102a may determine memory 134 resources required to complete the virtual machine 306 migration. For example, in some embodiments, the source compute node 102a may determine that space in the memory 134 greater than all memory pages to be transferred is required to complete the virtual machine 306 migration. In some embodiments, in block 420, the source compute node 102a may determine I/O resources required to complete the virtual machine 306 migration. For example, the source compute node 102a may determine required network bandwidth for completing the transfer. Additionally or alternatively, the source compute node 102a may determine whether particular I/O hardware functions are required. For example, the source compute node 102a may determine whether support for hardware-accelerated compression of network traffic is required.

In block 422, the source compute node 102a determines which platform resources are currently available to the source compute node 102a. As described above, the platform resources may include processor 120 resources, memory 134 resources, or I/O resources. The source compute node 102a may use any method for determining available platform resources, including hardware performance counters or performance monitoring units (PMUs) of the processor 120, or operating-system- or hypervisor-based hardware monitoring subsystems such as the perf subsystem. Reducing the latency and/or improving the accuracy of performance measurement may improve reliability and/or determinism of the virtual machine 306 migration process. In some embodiments, in block 424, the source compute node 102a may retrieve instantaneous data on currently available platform resources from the resource monitor 124 of the processor 120 and/or the resource monitor 130 of the I/O subsystem 128. Unlike traditional PMUs or software resource monitoring subsystems, the resource monitors 124, 130 may provide real-time, accurate information on the currently available platform resources with reduced time drift. Additionally, the resource monitors 124, 130 may provide real-time information on memory 134 resources and I/O resources that may not be monitored by traditional systems.

In block 426, the source compute node 102a determines whether sufficient platform resources are currently available to perform the virtual machine 306 migration within the requested service level requirements. The source compute node 102a may, for example, compare the required platform resources determined as described above in block 414 with the currently available platform resources determined as described above in block 422. If sufficient platform resources are currently available, the method 400 branches ahead to block 430, described below. If sufficient platform resources are not currently available, the method 400 advances to block 428.

If sufficient platform resources are not currently available, the source compute node 102a negotiates reduced service level requirements with the datacenter manager 104 in block 428. The source compute node 102a may successfully negotiate for reduced service level requirements that may be achieved using available platform resources. The source compute node 102a may determine the achievable service level based on the currently available platform resources, essentially reversing the calculation described above with response to block 414. Alternatively, the source compute node 102a may cancel the virtual machine 306 migration if an agreement with the datacenter manager 104 on reduced service level requirements cannot be reached. Negotiation of service level requirements is further discussed below in connection with FIGS. 7 and 8.

After determining the required platform resources are available or otherwise negotiating reduced service level requirements, the source compute node 102a reserves the platform resources for the duration of a predicted migration time in block 430. The source compute node 102a may reserve the required platform resources determined above in connection with block 414, or the negotiated platform resources described above in connection with block 428. The predicted migration time may correspond to the maximum total migration time of the applicable service level requirements, or may be calculated by the source compute node 102a based on available platform resources. Reserving the platform resources makes those platform resources usable exclusively or nearly exclusively by the virtual machine 306 migration process. For example, to reserve computational resources, the source compute node 102a may set processor affinity for the virtual machine 306 migration process. As another example, to reserve memory 134 resources, the source compute node 102a may pin, wire, or otherwise designate particular memory pages to remain resident in memory 134. However, in some embodiments, the reserved platform resources may still be interrupted or preempted in certain circumstances (i.e., the reservation may be a "best effort" reservation). For example, even if the virtual machine 306 migration process is designated to be the only process executed on a particular processor core 122, the virtual machine 306 migration process may still be interrupted or preempted by an operating system, virtual machine monitor 302, or other control process of the source compute node 102a.

Alternatively, in some embodiments, in block 432 the source compute node 102a may exclusively reserve the platform resources using the reservation manager 126 of the processor 120 and/or the reservation manager 132 of the I/O subsystem 128. Unlike operating-system- or hypervisor-based resource reservation, the reservation managers 126, 132 may provide the virtual machine 306 migration process with exclusive, uninterrupted control of the reserved platform resources for the specified time period. For example, the virtual machine 306 migration process may have exclusive access to one or more processor cores 122 without being interrupted or preempted by any operating system, virtual machine monitor 302, or hypervisor. Similarly, the virtual machine 306 migration process may be granted exclusive access to a portion of the memory 134, an amount of I/O bandwidth of the communication circuitry 138, and/or a particular I/O hardware function.

In block 434, the source compute node 102a transfers the virtual machine state of the requested virtual machine 306 to the destination compute node 102b using the reserved platform resources. To do so, the source compute node 102a may iteratively transfer memory pages to the destination compute node 102b and, if necessary, re-transmit memory pages that change before the transfer is completed ("dirty" pages). The source compute node 102a may packetize and compress the memory pages to reduce transfer time and perform any other processing necessary to complete the transfer. After the transfer of the virtual machine 306 state is completed, the virtual machine 306 is stopped on the source compute node 102a and resumed on the destination compute node 102b. Transferring the virtual machine 306 state is further discussed below in connection with FIGS. 5 and 6.

After transferring the virtual machine 306 state, in block 434 the source compute node 102a frees the platform resources that were reserved as described above in block 430. In some embodiments, the source compute node 102a may free the platform resources using the hardware reservation managers 126, 132 if appropriate. After freeing the reserved resources, the method 400 loops back to block 402 to await further migration requests.

Figure 5:
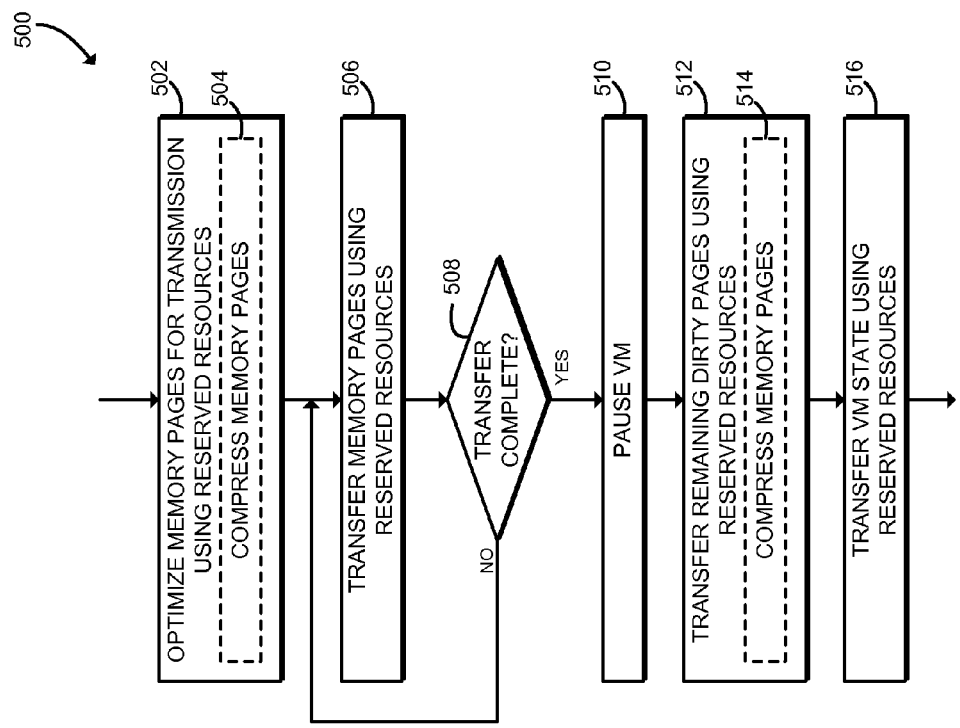
FIG. 5 is a simplified flow diagram of at least one embodiment of a method for transmitting virtual machine pages that may be executed by a compute node of the system of FIGS. 1 and 3.

Referring now to FIG. 5, in use, the source compute node 102a may execute a method 500 for transferring virtual machine state. The method 500 may be executed as a part of the method 400 described above, for example as all or part of block 434. The method 500 begins with block 502, in which the source compute node 102a optimizes the memory pages to be transferred using the reserved platform resources. The source compute node 102a may perform any processing, serialization, packetization, or other algorithm on the memory pages to prepare them for transmission. In block 504, the source compute node 102a may compress the memory pages to be transferred. Compressing the memory pages may be highly resource-intensive. As such, compressing the memory pages may benefit from the use of a dedicated processor 120 and/or processor core 122, or the use of dedicated hardware-accelerated compression support of the communication circuitry 138.

In block 506, the source compute node 102a transfers the memory pages to the destination compute node 102b. The source compute node 102a may use any technique for identifying, selecting, or tracking the memory pages to be transferred. For example, the source compute node 102a may iterate straight through all identified memory pages and then re-iterate over dirty pages. Regardless, in block 508, the source compute node 102a determines whether the transfer of memory pages is complete. The transfer may be complete when the source compute node 102a determines that the remaining memory pages may be transferred to the destination compute node 102b in a single operation (i.e., a "single shot" transfer). The source compute node 102a may base this determination the number of dirty memory pages, the memory load (e.g., the page dirty rate), or any other factor relating to the remaining time to transfer memory pages. If the transfer is not complete, the method 500 loops back to block 506 to continue transferring memory pages. If the transfer is complete, the method 500 advances to block 510.

In block 510, the source compute node 102a pauses the virtual machine 306. After the virtual machine 306 is paused, no further work is performed by the virtual machine 306, meaning that no new dirty memory pages may be produced. Additionally, after the virtual machine 306 is paused, no further services may be provided by the virtual machine 306. Thus, the period of downtime for the virtual machine 306 migration begins when the virtual machine 306 is paused.

In block 512, the source compute node 102a transfers the remaining dirty memory pages to the destination compute node 102b using the reserved platform resources. As described above, the transfer may be performed in a single operation. In some embodiments, in block 514 the source compute node 102a may compress the dirty memory pages prior to their transfer. For example, the source compute node 102a may apply delta compression to reduce the amount of data that must be transmitted over the network 106. As described above, the source compute node 102a may perform the compression using dedicated processor resources and/or I/O resources.

In block 516, the source compute node 102a transfers the remaining virtual machine 306 state to the destination compute node 102b using the reserved platform resources. For example, the source compute node 102a may transfer virtual processor states or virtualized, emulated, or para-virtualized device states of the virtual machine 306. After transmission of the virtual machine 306 state, the method 500 is completed. The source compute node 102a may release the reserved resources and complete the virtual machine 306 migration as described above in connection with FIG. 4.

Figure 6:
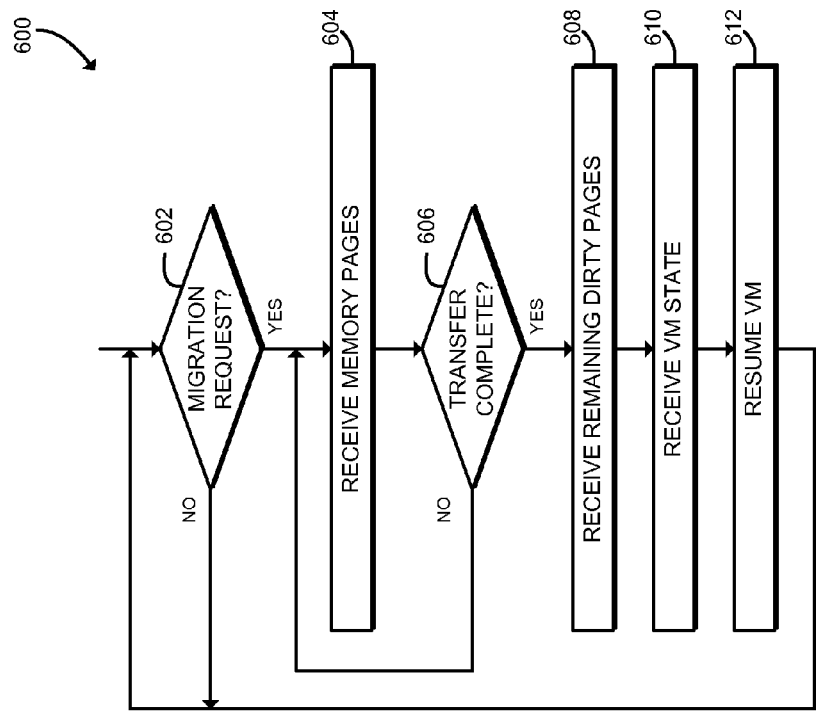
FIG. 6 is a simplified flow diagram of at least one embodiment of a method for receiving virtual machine pages that may be executed by a compute node of the system of FIGS. 1 and 3.

Referring now to FIG. 6, in use, the destination compute node 102b may execute a method 600 for receiving virtual machine state. The method 600 begins with block 602, in which the destination compute node 102b determines whether a request to migrate the virtual machine 306 from the source compute node 102a to the destination compute node 102b has been received. The request may originate from the source compute node 102a, the datacenter manager 104, or any combination of those devices. If no request is received, the method 600 loops back to block 602 to continue monitoring for migration requests. If a migration request is received, the method 600 advances to block 604.

In block 604, the destination compute node 102b receives memory pages from the source compute node 102a. As described above, the received memory pages may correspond to virtual memory state, virtual processor state, and/or virtual, emulated or para-virtualized device state of the virtual machine 306. As the memory pages are received, the memory pages may be copied into memory 134, decompressed, or otherwise prepared for use by the virtual machine 306. In block 606, the destination compute node 102b determines whether the transfer of memory pages is complete. The transfer may be complete based on an indication received from the source compute node 102a. If the transfer is not complete, the method 600 loops back to block 604 to continue receiving memory pages. If the transfer is complete, the method 600 advances to block 608.

In block 608, the destination compute node 102b receives the remaining dirty memory pages from the source compute node 102a. Transmission of the dirty memory pages is further described above in connection with block 512 of FIG. 5. In block 610, the destination compute node 102b receives the virtual machine 306 state from the source compute node 102a. Transmission of the virtual machine 306 state is further described above in connection with block 516 of FIG. 5.

After receiving all the memory pages and virtual machine 306 state, in block 612 the destination compute node 102b resumes the virtual machine 306. After being resumed, the virtual machine 306 is fully operational and capable of servicing requests. Thus, the migration downtime and the total migration time end when the virtual machine 306 is resumed by the destination compute node 102b. After resuming the virtual machine 306, the method 600 loops back to block 602 to await further migration requests.

Figure 7:
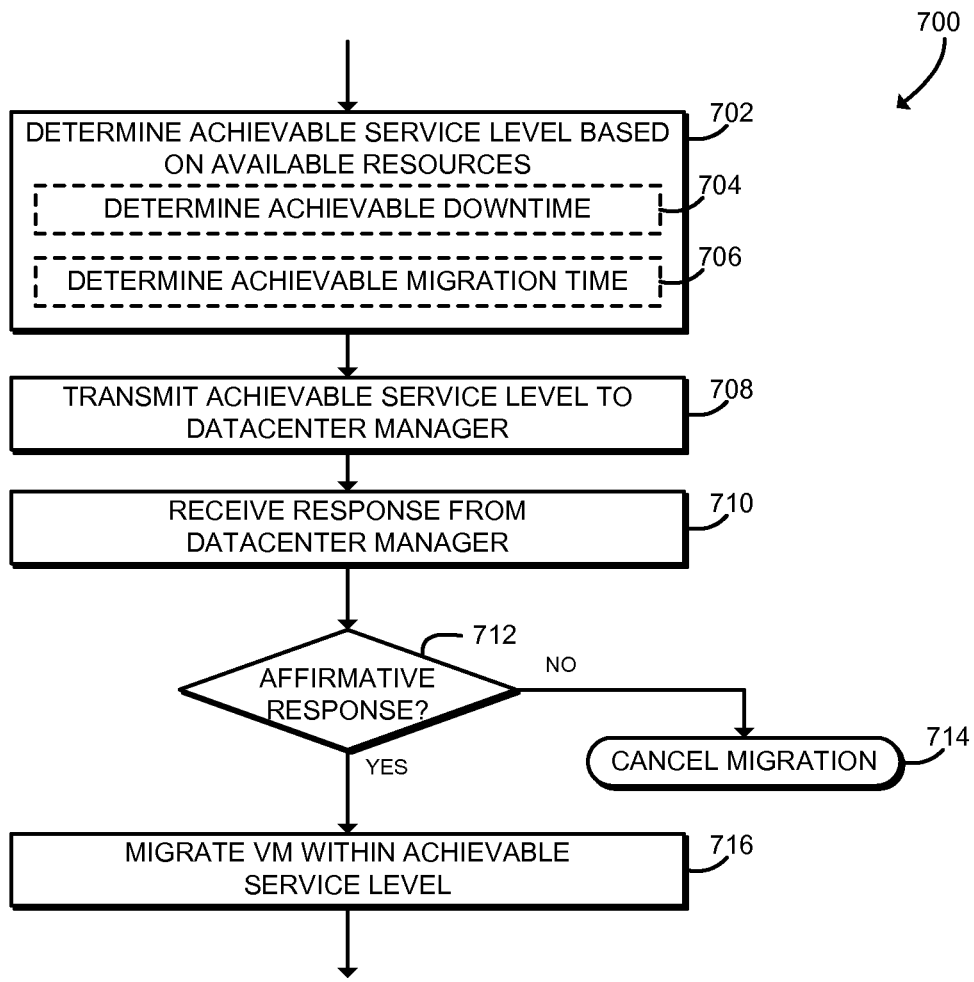
FIG. 7 is a simplified flow diagram of at least one embodiment of a method for negotiating service level requirements that may be executed by a compute node of the system of FIGS. 1 and 3.

Referring now to FIG. 7, in use, the source compute node 102a may execute a method 700 for negotiating service level requirements. The method 700 may be executed as a part of the method 400 described above, for example as all or part of block 428. The method 700 begins with block 702, in which the source compute node 102a determines an achievable service level based on currently available platform resources of the source compute node 102a. For example, the source compute node 102a may determine the achievable service level based on the amount of memory pages to transfer, the current or estimated memory load, or other factors controlling the amount of processing required to migrate the virtual machine 306 compared with the currently available platform resources of the compute node 102 (e.g., currently available processor resources, memory resources, or I/O resources). The achievable service level may be expressed as any combination of performance and/or reliability limits, thresholds, metrics, or other measures that are predicted to be achievable while migrating the virtual machine 306. In some embodiments, in block 704 the source compute node 102a may determine an achievable maximum downtime. In some embodiments, in block 706 the compute node 102a may determine an achievable maximum total migration time.

In block 708, the source compute node 102a transmits the achievable service level to the datacenter manager 104. As described further below in connection with FIG. 8, the datacenter manager 104 may determine whether the achievable service level is acceptable. In block 710, the source compute node 102a receives a response from the datacenter manager 104, which indicates whether the achievable service level is acceptable and thus may be affirmative or negative. In block 712, the compute node 102a determines whether the response is affirmative. If not, the method 700 branches to block 714, in which the source compute node 102a cancels the virtual machine 306 migration. After canceling the migration, the method 700, the method 400 described above in connection with FIG. 4, or any other virtual machine 306 migration process may be terminated. Referring back to block 712, if the response from the datacenter manager 104 is affirmative, the method 700 advances to block 716.

In block 716, the source compute node 102a migrates the virtual machine 306 within the achievable service level. As described above in connection with FIG. 5, the source compute node 102a may reserve the currently available platform resources to perform the virtual machine 306 migration within the achievable service level. The virtual machine 306 migration may proceed as described above in connection with FIGS. 4-6.

Figure 8:
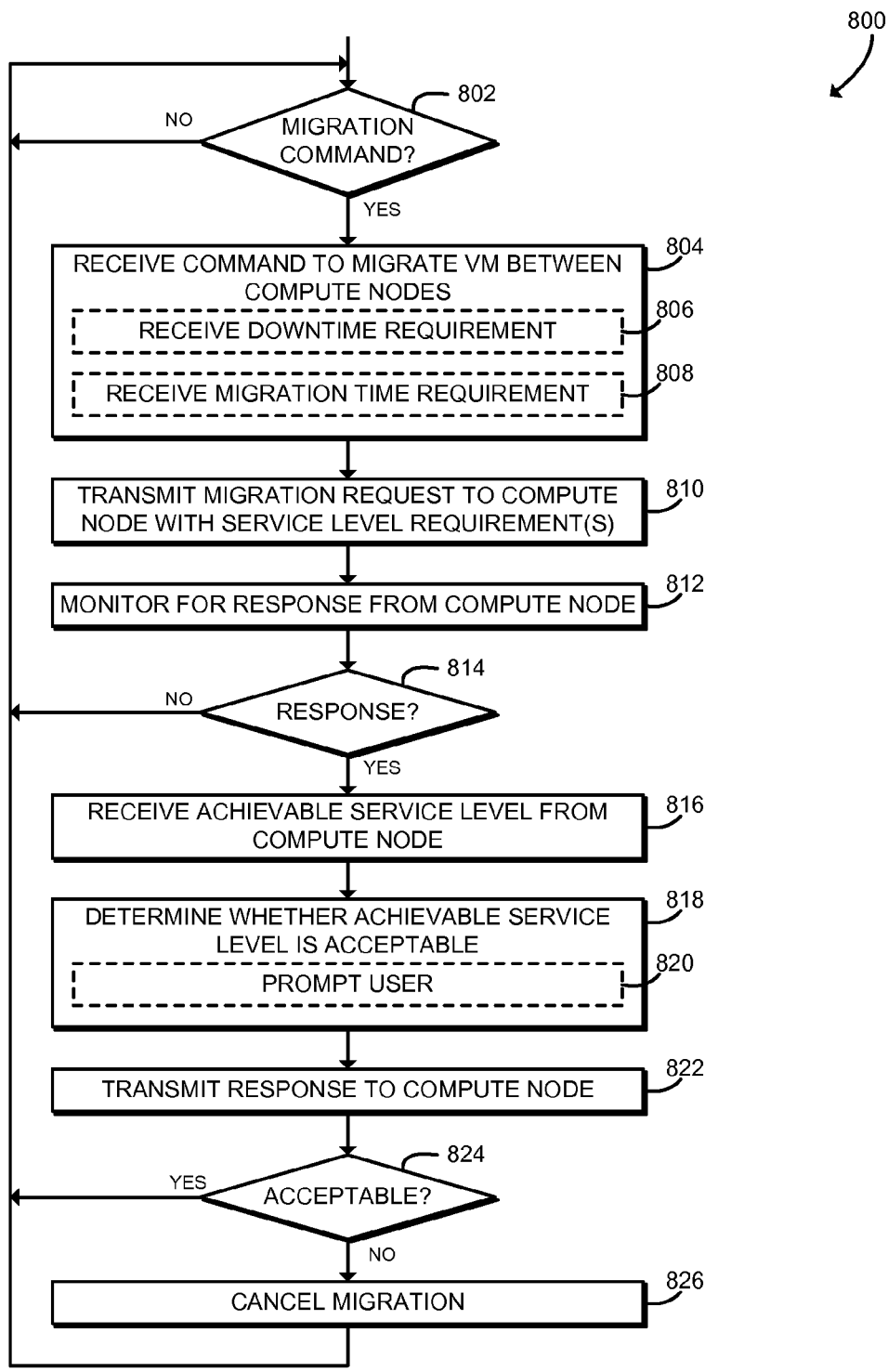
FIG. 8 is a simplified flow diagram of at least one embodiment of a method for negotiating service level requirements that may be executed by a datacenter manager of the system of FIGS. 1 and 3.

Referring now to FIG. 8, in use, the datacenter manager 104 may execute a method 800 for negotiating service level requirements. The method 800 begins with block 802, in which the datacenter manager 104 determines whether it has received a migration request. If not, the method 800 loops back to block 802 to continue monitoring for migration requests. If a migration request is received, the method 800 advances to block 804.

In block 804, the datacenter manager 104 receives the request for virtual machine migration. The request may be received from a user of the datacenter manager 104 such as an administrator of the system 100, or may be generated without user intervention, for example by a load balancing process of the datacenter manager 104. The request for virtual machine migration may specify the virtual machine 306 to be migrated, the source compute node 102a, the destination compute node 102b, as well as one or more service level requirements for the migration. The service level requirements may specify any limit, threshold, metric, or other performance and/or reliability measure to be achieved while migrating the virtual machine 306 from the source compute node 102a to the destination compute node 102b. In some embodiments, in block 806 the datacenter manager 104 may receive a downtime requirement with the request. The downtime requirement may specify a maximum time that the virtual machine 306 is to be paused or otherwise unavailable during the migration. For example, in some telecommunication network function virtualization (NFV) workloads, the downtime requirement may be expressed as a number of microseconds or milliseconds. In some embodiments, in block 808, the datacenter manager 104 may receive a migration time requirement. The migration time requirement may specify a maximum total migration time, that is, a maximum time between receipt of the request for migration by the source compute node 102a and activation of the virtual machine 306 on the destination compute node 102b.

In block 810, the datacenter manager 104 transmits the virtual machine 306 migration request to the source compute node 102a, including any service level requirements. As described above in connection with FIGS. 4 and 7, the source compute node 102a may determine whether the service level requirements may be achieved using currently available platform resources of the source compute node 102a. If not, the source compute node 102a may transmit an achievable service level to the datacenter manager 104. In block 812, the datacenter manager 104 monitors for a response from the source compute node 102a. In block 814, the datacenter manager 104 determines whether a response is received. If no response is received, the method 800 loops back to block 802 to continue monitoring for virtual machine migration commands. In those circumstances, the source compute node 102a may be capable of achieving the service level requirements and may proceed with the virtual machine 306 migration. Referring back to block 814, if a response is received from the source compute node 102a, the method 800 advances to block 816.

In block 816, the datacenter manager 104 receives the achievable service level from the source compute node 102a. As described above, the achievable service level may be expressed as any combination of performance and/or reliability limits, thresholds, metrics, or other measures that are predicted to be achievable while migrating the virtual machine 306. For example, the achievable service level may include a maximum downtime and/or a maximum total migration time.

In block 818, the datacenter manager 104 determines whether the achievable service level received from the source compute node 102a is acceptable. The datacenter manager 104 may use any criteria to determine whether the service level is acceptable. The acceptable service level may depend on the workload of the particular virtual machine 306 to be migrated. For example, the datacenter manager 104 may determine whether the achievable service level satisfies requirements for telecommunication network function virtualization (NFV) workloads, for datacenter workloads, or for other appropriate workloads. In some embodiments, in block 820 the datacenter manager 104 may prompt a user to determine whether the achievable service level is acceptable.

In block 822, the datacenter manager 104 transmits a response to the source compute node 102a that indicates whether the achievable service level is acceptable. In block 824, the datacenter manager 104 branches based on whether the achievable service is acceptable. If acceptable, the method 800 loops back to block 802 to continue monitoring for virtual machine migration commands. If not acceptable, the method 800 advances to block 826. In block 826, the datacenter manager 104 cancels the migration of the virtual machine 306 from the source compute node 102a to the destination compute node 102b. After canceling the virtual machine 306 migration, the datacenter manager 104 may reschedule, resubmit, or otherwise redo the migration on the same compute nodes 102 or on different compute nodes 102. Additionally or alternatively, in some circumstances the datacenter manager 104 may allow the virtual machine 306 to continue on the current compute node 102 without migration. After canceling the migration, the method 800 loops back to block 802 to continue monitoring for additional migration commands.

Examples

Illustrative examples of the technologies disclosed herein are provided below. An embodiment of the technologies may include any one or more, and any combination of, the examples described below.

Example 1 includes a compute node for migrating a virtual machine, the compute node comprising a virtual machine migration module to receive a request to migrate a virtual machine to a destination compute node, wherein the request includes a service level requirement; a service level management module to determine platform resources required to migrate the virtual machine and satisfy the service level requirement; and a resource management module to (i) determine whether the required platform resources are currently available to the compute node and (ii) reserve the required platform resources for a predicted migration time in response to a determination that the required platform resources are currently available; wherein the virtual machine migration module is further to migrate, in response to reservation of the required platform resources, the virtual machine to the destination compute node using the reserved platform resources.

Example 2 includes the subject matter of Example 1, and further including a hardware resource monitor, wherein to determine whether the required platform resources are currently available comprises to query the hardware resource monitor.

Example 3 includes the subject matter of any of Examples 1 and 2, and wherein the hardware resource monitor comprises a hardware resource monitor of a processor of the compute node or a hardware resource monitor of an I/O subsystem of the compute node.

Example 4 includes the subject matter of any of Examples 1-3, and further including a hardware reservation manager, wherein to reserve the required platform resources comprises to reserve the required platform resources using the hardware reservation manager.

Example 5 includes the subject matter of any of Examples 1-4, and wherein the hardware reservation manager comprises a hardware reservation manager of a processor of the compute node or a hardware reservation manager of an I/O subsystem of the compute node.

Example 6 includes the subject matter of any of Examples 1-5, and wherein the service level requirement comprises a maximum downtime requirement or a maximum total migration time requirement.

Example 7 includes the subject matter of any of Examples 1-6, and wherein the service level requirement comprises a maximum network bandwidth usage requirement.

Example 8 includes the subject matter of any of Examples 1-7, and wherein the platform resources comprise at least one of processor resources, memory resources, or I/O resources.

Example 9 includes the subject matter of any of Examples 1-8, and wherein the resource management module is further to determine currently available platform resources of the compute node in response to a determination that the required platform resources are not currently available to the compute node; the service level management module is further to determine an achievable service level for the request to migrate the virtual machine based on the currently available platform resources; the virtual machine migration module is further to (i) transmit the achievable service level to a datacenter manager; and (ii) receive a response from the datacenter manager in response to the achievable service level; and the resource management module is further to reserve the currently available platform resources for the predicted migration time in response to receipt of an affirmative response from the datacenter manager.

Example 10 includes the subject matter of any of Examples 1-9, and wherein the virtual machine migration module is further to cancel the request to migrate the virtual machine in response to receipt of a negative response from the datacenter manager.

Example 11 includes the subject matter of any of Examples 1-10, and further including a hardware resource monitor, wherein to determine the currently available platform resources comprises to query the hardware resource monitor.

Example 12 includes the subject matter of any of Examples 1-11, and wherein the hardware resource monitor comprises a hardware resource monitor of a processor of the compute node or a hardware resource monitor of an I/O subsystem of the compute node.

Example 13 includes the subject matter of any of Examples 1-12, and further including a hardware reservation manager, wherein to reserve the currently available platform resources comprises to reserve the currently available platform resources using the hardware reservation manager.

Example 14 includes the subject matter of any of Examples 1-13, and wherein the hardware reservation manager comprises a hardware reservation manager of a processor of the compute node or a hardware reservation manager of an I/O subsystem of the compute node.

Example 15 includes a datacenter manager for migrating virtual machines, the datacenter manager comprising a virtual machine schedule module to transmit from the datacenter manager to a source compute node a request to migrate a virtual machine of the source compute node to a destination compute node, wherein the request includes a service level requirement to be satisfied by the source compute node; and a service level negotiation module to: receive, in response to transmission of the request to migrate the virtual machine, an achievable service level from the source compute node, wherein the achievable service level indicates a service level achievable to migrate the virtual machine with currently available platform resources of the compute node; determine whether the achievable service level is acceptable; and transmit an affirmative response to the source compute node in response to a determination that the achievable service level is acceptable.

Example 16 includes the subject matter of Example 15, and wherein the service level negotiation module is further to transmit a negative response to the source compute node in response to a determination that the achievable service level is not acceptable.

Example 17 includes the subject matter of any of Examples 15 and 16, and wherein the achievable service level comprises a maximum downtime or a maximum total migration time.

Example 18 includes the subject matter of any of Examples 15-17, and wherein the service level requirement comprises a maximum network bandwidth usage requirement.

Example 19 includes a method for migrating a virtual machine, the method comprising receiving, by a compute node, a request to migrate a virtual machine to a destination compute node, the request including a service level requirement; determining, by the compute node, platform resources required to migrate the virtual machine and satisfy the service level requirement; determining, by the compute node, whether the required platform resources are currently available to the compute node; reserving, by the compute node, the required platform resources for a predicted migration time in response to determining the required platform resources are currently available; and migrating, by the compute node and in response to reserving the required platform resources, the virtual machine to the destination compute node using the reserved platform resources.

Example 20 includes the subject matter of Example 19, and wherein determining whether the required platform resources are currently available comprises querying a hardware resource monitor of the compute node.

Example 21 includes the subject matter of any of Examples 19 and 20, and wherein querying the hardware resource monitor comprises querying a hardware resource monitor of a processor of the compute node or querying a hardware resource monitor of an I/O subsystem of the compute node.

Example 22 includes the subject matter of any of Examples 19-21, and wherein reserving the required platform resources comprises reserving the required platform resources using a hardware reservation manager of the compute node.

Example 23 includes the subject matter of any of Examples 19-22, and wherein using the hardware reservation manager comprises using a hardware reservation manager of a processor of the compute node or querying a hardware reservation manager of an I/O subsystem of the compute node.

Example 24 includes the subject matter of any of Examples 19-23, and wherein the service level requirement comprises a maximum downtime requirement or a maximum total migration time requirement.

Example 25 includes the subject matter of any of Examples 19-24, and wherein the service level requirement comprises a maximum network bandwidth usage requirement.

Example 26 includes the subject matter of any of Examples 19-25, and wherein the platform resources comprise at least one of processor resources, memory resources, or I/O resources.

Example 27 includes the subject matter of any of Examples 19-26, and further including, in response to determining the required platform resources are not currently available to the compute node, determining, by the compute node, currently available platform resources of the compute node; determining, by the compute node, an achievable service level for the request to migrate the virtual machine based on the currently available platform resources; transmitting, by the compute node, the achievable service level to a datacenter manager; receiving, by the compute node, a response from the datacenter manager in response to the achievable service level; and reserving, by the compute node, the currently available platform resources for the predicted migration time in response to receiving an affirmative response from the datacenter manager.

Example 28 includes the subject matter of any of Examples 19-27, and further including canceling, by the compute node, the request to migrate the virtual machine in response to receiving a negative response from the datacenter manager.

Example 29 includes the subject matter of any of Examples 19-28, and wherein determining the currently available platform resources comprises querying a hardware resource monitor of the compute node.

Example 30 includes the subject matter of any of Examples 19-29, and wherein querying the hardware resource monitor comprises querying a hardware resource monitor of a processor of the compute node or querying a hardware resource monitor of an I/O subsystem of the compute node.

Example 31 includes the subject matter of any of Examples 19-30, and wherein reserving the currently available platform resources comprises reserving the currently available platform resources using a hardware reservation manager of the compute node.

Example 32 includes the subject matter of any of Examples 19-31, and wherein using the hardware reservation manager comprises using a hardware reservation manager of a processor of the compute node or using a hardware reservation manager of an I/O subsystem of the compute node.

Example 33 includes a method for migrating a virtual machine, the method comprising transmitting, by a datacenter manager to a source compute node, a request to migrate a virtual machine of the source compute node to a destination compute node, the request including a service level requirement to be satisfied by the source compute node; receiving, by the datacenter manager in response to transmitting the request to migrate the virtual machine, an achievable service level from the source compute node, the achievable service level indicating a service level achievable to migrate the virtual machine with currently available platform resources of the compute node; determining, by the datacenter manager, whether the achievable service level is acceptable; and transmitting, by the datacenter manager, an affirmative response to the source compute node in response to determining the achievable service level is acceptable.

Example 34 includes the subject matter of Example 33, and further including transmitting, by the datacenter manager, a negative response to the source compute node in response to determining the achievable service level is not acceptable.

Example 35 includes the subject matter of any of Examples 33 and 34, and wherein the achievable service level comprises a maximum downtime or a maximum total migration time.

Example 36 includes the subject matter of any of Examples 33-35, and wherein the service level requirement comprises a maximum network bandwidth usage requirement.

Example 37 includes a computing device comprising a processor; and a memory having stored therein a plurality of instructions that when executed by the processor cause the computing device to perform the method of any of Examples 19-36.

Example 38 includes one or more machine readable storage media comprising a plurality of instructions stored thereon that in response to being executed result in a computing device performing the method of any of Examples 19-36.

Example 39 includes a computing device comprising means for performing the method of any of Examples 19-36.

Example 40 includes a compute node for migrating a virtual machine, the compute node comprising means for receiving a request to migrate a virtual machine to a destination compute node, the request including a service level requirement; means for determining platform resources required to migrate the virtual machine and satisfy the service level requirement; means for determining whether the required platform resources are currently available to the compute node; means for reserving the required platform resources for a predicted migration time in response to determining the required platform resources are currently available; and means for migrating, in response to reserving the required platform resources, the virtual machine to the destination compute node using the reserved platform resources.

Example 41 includes the subject matter of Example 40, and wherein the means for determining whether the required platform resources are currently available comprises means for querying a hardware resource monitor of the compute node.

Example 42 includes the subject matter of any of Examples 40 and 41, and wherein the means for querying the hardware resource monitor comprises means for querying a hardware resource monitor of a processor of the compute node or means for querying a hardware resource monitor of an I/O subsystem of the compute node.

Example 43 includes the subject matter of any of Examples 40-42, and wherein the means for reserving the required platform resources comprises means for reserving the required platform resources using a hardware reservation manager of the compute node.

Example 44 includes the subject matter of any of Examples 40-43, and wherein the means for reserving the required platform resources using the hardware reservation manager comprises means for using a hardware reservation manager of a processor of the compute node or means for using a hardware reservation manager of an I/O subsystem of the compute node.

Example 45 includes the subject matter of any of Examples 40-44, and wherein the service level requirement comprises a maximum downtime requirement or a maximum total migration time requirement.

Example 46 includes the subject matter of any of Examples 40-45, and wherein the service level requirement comprises a maximum network bandwidth usage requirement.

Example 47 includes the subject matter of any of Examples 40-46, and wherein the platform resources comprise at least one of processor resources, memory resources, or I/O resources.

Example 48 includes the subject matter of any of Examples 40-47, and further including, in response to determining the required platform resources are not currently available to the compute node, means for determining currently available platform resources of the compute node; means for determining an achievable service level for the request to migrate the virtual machine based on the currently available platform resources; means for transmitting the achievable service level to a datacenter manager; means for receiving a response from the datacenter manager in response to the achievable service level; and means for reserving the currently available platform resources for the predicted migration time in response to receiving an affirmative response from the datacenter manager.

Example 49 includes the subject matter of any of Examples 40-48, and further including means for canceling the request to migrate the virtual machine in response to receiving a negative response from the datacenter manager.

Example 50 includes the subject matter of any of Examples 40-49, and wherein the means for determining the currently available platform resources comprises means for querying a hardware resource monitor of the compute node.

Example 51 includes the subject matter of any of Examples 40-50, and wherein the means for querying the hardware resource monitor comprises means for querying a hardware resource monitor of a processor of the compute node or means for querying a hardware resource monitor of an I/O subsystem of the compute node.

Example 52 includes the subject matter of any of Examples 40-51, and wherein the means for reserving the currently available platform resources comprises means for reserving the currently available platform resources using a hardware reservation manager of the compute node.

Example 53 includes the subject matter of any of Examples 40-52, and wherein the means for reserving the currently available platform resources using the hardware reservation manager comprises means for using a hardware reservation manager of a processor of the compute node or means for using a hardware reservation manager of an I/O subsystem of the compute node.

Example 54 includes a datacenter manager for migrating virtual machines, the datacenter manager comprising means for transmitting, to a source compute node, a request to migrate a virtual machine of the source compute node to a destination compute node, the request including a service level requirement to be satisfied by the source compute node; means for receiving, in response to transmitting the request to migrate the virtual machine, an achievable service level from the source compute node, the achievable service level indicating a service level achievable to migrate the virtual machine with currently available platform resources of the compute node; means for determining whether the achievable service level is acceptable; and means for transmitting an affirmative response to the source compute node in response to determining the achievable service level is acceptable.

Example 55 includes the subject matter of Example 54, and further including means for transmitting a negative response to the source compute node in response to determining the achievable service level is not acceptable.

Example 56 includes the subject matter of any of Examples 54 and 55, and wherein the achievable service level comprises a maximum downtime or a maximum total migration time.

Example 57 includes the subject matter of any of Examples 54-56, and wherein the service level requirement comprises a maximum network bandwidth usage requirement.

The invention claimed is:

1. A compute node for migrating a virtual machine, the compute node comprising:
   a virtual machine migration module to receive a request to migrate a virtual machine of the compute node to a destination compute node, wherein the request includes a service level requirement that specifies at least one performance measure to be achieved by the compute node while the virtual machine is migrated;
   a service level management module to (i) determine platform resources of the compute node required to migrate the virtual machine and satisfy the service level requirement and (ii) determine an achievable service level for the request to migrate the virtual machine based on the currently available platform resources of the compute node, wherein the achievable service level specifies at least one performance measure that is predicted to be achievable by the compute node with the currently available platform resources; and
   a resource management module to (i) determine whether the required platform resources of the compute node are currently available to the compute node and (ii) reserve the required platform resources of the compute node for a predicted migration time in response to a determination that the required platform resources are currently available;
   wherein the virtual machine migration module is further to migrate, in response to reservation of the required platform resources, the virtual machine from the compute node to the destination compute node using the reserved platform resources of the compute node.

2. The compute node of claim 1, further comprising a hardware resource monitor, wherein to determine whether the required platform resources are currently available comprises to query the hardware resource monitor.

3. The compute node of claim 2, wherein the hardware resource monitor comprises a hardware resource monitor of a processor of the compute node or a hardware resource monitor of an I/O subsystem of the compute node.

4. The compute node of claim 1, further comprising a hardware reservation manager, wherein to reserve the required platform resources comprises to reserve the required platform resources using the hardware reservation manager.

5. The compute node of claim 4, wherein the hardware reservation manager comprises a hardware reservation manager of a processor of the compute node or a hardware reservation manager of an I/O subsystem of the compute node.

6. The compute node of claim 1, wherein the service level requirement comprises a maximum downtime requirement or a maximum total migration time requirement.

7. The compute node of claim 1, wherein the service level requirement comprises a maximum network bandwidth usage requirement.

8. The compute node of claim 1, wherein the platform resources comprise at least one of processor resources, memory resources, or I/O resources.

9. The compute node of claim 1, wherein:
   the virtual machine migration module is further to (i) transmit the achievable service level to a datacenter manager; and (ii) receive a response from the datacenter manager in response to the achievable service level; and
   the resource management module is further to reserve the currently available platform resources of the compute node for the predicted migration time in response to receipt of an affirmative response from the datacenter manager.

10. The compute node of claim 9, further comprising a hardware resource monitor, wherein to determine the currently available platform resources comprises to query the hardware resource monitor.

11. The compute node of claim 9, further comprising a hardware reservation manager, wherein to reserve the currently available platform resources comprises to reserve the currently available platform resources using the hardware reservation manager.

12. One or more non-transitory computer-readable storage media comprising a plurality of instructions that in response to being executed cause a compute node to:
   receive a request to migrate a virtual machine of the compute node to a destination compute node, the request including a service level requirement that specifies at least one performance measure to be achieved by the compute node while the virtual machine is migrated;
   determine platform resources of the compute node required to migrate the virtual machine and satisfy the service level requirement;
   determine whether the required platform resources of the compute node are currently available to the compute node;
   determine an achievable service level for the request to migrate the virtual machine based on the currently available platform resources of the compute node, wherein the achievable service level specifies at least one performance measure that is predicted to be achievable by the compute node with the currently available platform resources of the compute node;
   reserve the required platform resources of the compute node for a predicted migration time in response to determining the required platform resources are currently available; and
   migrate, in response to reserving the required platform resources, the virtual machine from the compute node to the destination compute node using the reserved platform resources of the compute node.

13. The one or more non-transitory computer-readable storage media of claim 12, wherein to determine whether the required platform resources are currently available comprises to query a hardware resource monitor of the compute node.

14. The one or more non-transitory computer-readable storage media of claim 12, wherein to reserve the required platform resources comprises to reserve the required platform resources using a hardware reservation manager of the compute node.

15. The one or more non-transitory computer-readable storage media of claim 12, further comprising a plurality of instructions that in response to being executed cause the compute node, in response to determining the required platform resources of the compute node are not currently available to the compute node, to:
  transmit the achievable service level to a datacenter manager;
  receive a response from the datacenter manager in response to the achievable service level; and
  reserve the currently available platform resources of the compute node for the predicted migration time in response to receiving an affirmative response from the datacenter manager.

16. The one or more non-transitory computer-readable storage media of claim 15, wherein to determine the currently available platform resources comprises to query a hardware resource monitor of the compute node.

17. The one or more non-transitory computer-readable storage media of claim 15, wherein to reserve the currently available platform resources comprises to reserve the currently available platform resources using a hardware reservation manager of the compute node.

18. A datacenter manager for migrating virtual machines, the datacenter manager comprising:
  a virtual machine schedule module to transmit from the datacenter manager to a source compute node a request to migrate a virtual machine of the source compute node to a destination compute node, wherein the request includes a service level requirement that specifies at least one performance measure to be achieved by the source compute node while the virtual machine is migrated; and
  a service level negotiation module to:
    receive, in response to transmission of the request to migrate the virtual machine, an achievable service level from the source compute node, wherein the achievable service level indicates at least one performance measure that is predicted to be achievable by the source compute node to migrate the virtual machine with currently available platform resources of the source compute node;
    determine whether the achievable service level is acceptable; and
    transmit an affirmative response to the source compute node in response to a determination that the achievable service level is acceptable, wherein the source compute node migrates the virtual machine to the destination compute node in response to the affirmative response.

19. The datacenter manager of claim 18, wherein the service level negotiation module is further to transmit a negative response to the source compute node in response to a determination that the achievable service level is not acceptable.

20. The datacenter manager of claim 18, wherein the achievable service level comprises a maximum downtime or a maximum total migration time.

21. The datacenter manager of claim 18, wherein the service level requirement comprises a maximum network bandwidth usage requirement.

22. One or more non-transitory computer-readable storage media comprising a plurality of instructions that in response to being executed cause a datacenter manager to:
  transmit, to a source compute node, a request to migrate a virtual machine of the source compute node to a destination compute node, the request including a service level requirement that specifies at least one performance measure to be achieved by the source compute node while the virtual machine is migrated;
  receive, in response to transmitting the request to migrate the virtual machine, an achievable service level from the source compute node, the achievable service level indicating at least one performance measure that is predicted to be achievable by the source compute node to migrate the virtual machine with currently available platform resources of the source compute node;
  determine whether the achievable service level is acceptable; and
  transmit an affirmative response to the source compute node in response to determining the achievable service level is acceptable, wherein the source compute node migrates the virtual machine to the destination compute node in response to the affirmative response.

23. The one or more non-transitory computer-readable storage media of claim 22, further comprising a plurality of instructions that in response to being executed cause the datacenter manager to transmit a negative response to the source compute node in response to determining the achievable service level is not acceptable.

24. The one or more non-transitory computer-readable storage media of claim 22, wherein the achievable service level comprises a maximum downtime or a maximum total migration time.

25. The one or more non-transitory computer-readable storage media of claim 22, wherein the service level requirement comprises a maximum network bandwidth usage requirement.

* * * * *